United States Patent
Cantor et al.

(10) Patent No.: US 9,021,308 B2
(45) Date of Patent: Apr. 28, 2015

(54) ANALYZING A PROCESS OF SOFTWARE DEFECTS HANDLING USING PERCENTILE-BASED METRICS

(75) Inventors: Murray Cantor, Westwood, MA (US); Amit Fisher, Nofit (IL); Sateesh S Kannegala, Bangalore (IN); Segev Wasserkrug, Haifa (IL); Sergey N Zeltyn, Haifa (IL)

(73) Assignee: International Business Machines Corporation, Armonk, NY (US)

(*) Notice: Subject to any disclaimer, the term of this patent is extended or adjusted under 35 U.S.C. 154(b) by 300 days.

(21) Appl. No.: 13/205,651

(22) Filed: Aug. 9, 2011

(65) Prior Publication Data

US 2013/0042149 A1 Feb. 14, 2013

(51) Int. Cl.
G06F 11/00 (2006.01)
G06F 11/32 (2006.01)
G06F 11/07 (2006.01)

(52) U.S. Cl.
CPC .......... *G06F 11/321* (2013.01); *G06F 11/0793* (2013.01)

(58) Field of Classification Search
CPC ............ G06F 11/3616; G06F 11/3409; G06F 11/3466; G06F 11/3684; G06F 2201/86; G06F 11/0793; G06F 11/321
USPC ................. 714/38.1, 47.2, 47.3, 57
See application file for complete search history.

(56) References Cited

U.S. PATENT DOCUMENTS

| | | | |
|---|---|---|---|
| 6,219,805 B1 | 4/2001 | Jones et al. | |
| 6,643,613 B2 | 11/2003 | McGee et al. | |
| 6,816,898 B1 * | 11/2004 | Scarpelli et al. | 709/224 |
| 7,003,766 B1 | 2/2006 | Hong | |
| 7,076,695 B2 | 7/2006 | McGee et al. | |
| 7,185,231 B2 * | 2/2007 | Mullally et al. | 714/38.14 |
| 7,188,169 B2 | 3/2007 | Buus et al. | |
| 7,225,103 B2 | 5/2007 | Beresniewicz et al. | |

(Continued)

FOREIGN PATENT DOCUMENTS

WO 2008134070 11/2008

OTHER PUBLICATIONS

Dennis Kafura and Geereddy R. Reddy, "The Use of Software Complexity Metrics in Software Maintenance", Aug. 1985.

(Continued)

*Primary Examiner* — Bryce Bonzo
*Assistant Examiner* — Elmira Mehrmanesh

(57) ABSTRACT

A system for analyzing one or more process of software defect handling using one or more percentile-based statistical metric is provided herein. The system may include: a monitoring unit that is configured to monitor one or more processes of software defect handling, to yield monitored samples. The system further includes a percentile-based generator configured to generate one or more statistical metric that are at least partially based on percentile, further based on the monitored samples and further responsive to user selection; and a statistical calculation unit configured to apply the generated one or more statistical metric to real-time handling time samples obtained from the one or more processes of software defect handling, to yield a percentile-based analysis of the processes of software defect handling. The system may further include and a visual representation unit configured to visually present the percentile-based analysis responsive to preferences specified by the user.

15 Claims, 8 Drawing Sheets

(56) References Cited

U.S. PATENT DOCUMENTS

| | | | |
|---|---|---|---|
| 7,441,154 B2* | 10/2008 | Klotz et al. | 714/39 |
| 7,617,172 B2* | 11/2009 | Ramsey et al. | 706/53 |
| 7,669,180 B2 | 2/2010 | Bassin et al. | |
| 7,747,988 B2* | 6/2010 | Zhu et al. | 717/131 |
| 7,793,271 B2 | 9/2010 | Raffo | |
| 2005/0015683 A1* | 1/2005 | Clark et al. | 714/48 |
| 2005/0076113 A1* | 4/2005 | Klotz et al. | 709/224 |
| 2005/0283751 A1* | 12/2005 | Bassin et al. | 717/100 |
| 2006/0149575 A1 | 7/2006 | Varadarajan et al. | |
| 2010/0251218 A1 | 9/2010 | Mahesh et al. | |
| 2011/0173199 A1* | 7/2011 | Heisig et al. | 707/737 |
| 2011/0239048 A1* | 9/2011 | Andrade et al. | 714/35 |

OTHER PUBLICATIONS

DACS Gold Practice website, "Metrics-based scheduling" URL: https://goldpractice.thedacs.com/practices/mbs/#_[Putnam,_2003]. last printed on Jun. 26, 2011.

Ed Weller, "Applying Quantitative Methods to Software Maintenance", Bull, 2000.

George E. Stark, Louise C. Kern and C. W. Vowel!, "A Software Metric Set for Program Maintenance Management", Journal of Systems and Software vol. 24, Issue 3, Mar. 1994, pp. 239-249.

Tang Li, Mei Yonggang, Ding Jiajie, "Metric-Based Tracking Management in Software Maintenance", Education Technology and Computer Science (ETCS), 2010 Second International Workshop, vol. 1 on pp. 675-678.

* cited by examiner

ANALYZING A PROCESS OF SOFTWARE DEFECTS HANDLING USING PERCENTILE-BASED METRICS

BACKGROUND

1. Technical Field

The present invention relates to statistical process analysis and more particularly, to analyzing software defects handling processes using multiple statistical metrics.

2. Discussion of the Related Art

The software engineering industry invests today significant resources in Sustaining Engineering and Maintenance (SEM) which accounts to the process of continuing engineering and technical support following a release of a new product. A major part of this effort is focused on issues that arise when a customer reports a problem or a defect in a software product, or a product defect is discovered internally. When this occurs, a Problem Management Report (PMR) is opened. Most PMRs can be solved without changing the product code but some need the code change, which demands a special kind of defect handling process.

Defect handling time is a key metric that measures efficiency of the SEM processes and strongly affects customer satisfaction. Hence, keeping this metric under control and evaluating its trends is very important. Statistical analysis shows that defect handling times are heavy-tailed, i.e., there is a non-negligible probability to observe very long handling times. Such observations can significantly affect the sample mean. Therefore, distinguishing between "random noise" and statistically significant metric changes becomes an important challenge. More particularly, in heavy tailed distributions, statistically methods that are based on mean handling times or normal assumptions are unreliable.

BRIEF SUMMARY

One aspect of the invention provides a software analysis tool for analyzing one or more process of software defect handling using one or more statistical metrics that are at least partially percentile-based. The system may include: a monitoring unit that is configured to monitor one or more processes of software defect handling, to yield samples representative of defects handling time. The system further includes a percentile-based generator configured to generate one or more percentile-based statistical metric, further based on the monitored samples and further responsive to user selection; and a statistical calculation unit configured to apply the generated one or more percentile-based statistical metric to real-time handling time samples obtained from the one or more processes of software defect handling, to yield a percentile-based analysis of the one or more processes of software defect handling. The system may further include and a visual representation unit configured to visually present the percentile-based analysis responsive to preferences specified by the user. Advantageously, embodiments of the present invention utilize non-parametric statistical method so the distribution of the defect handling time does not affect the metric and the analysis.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
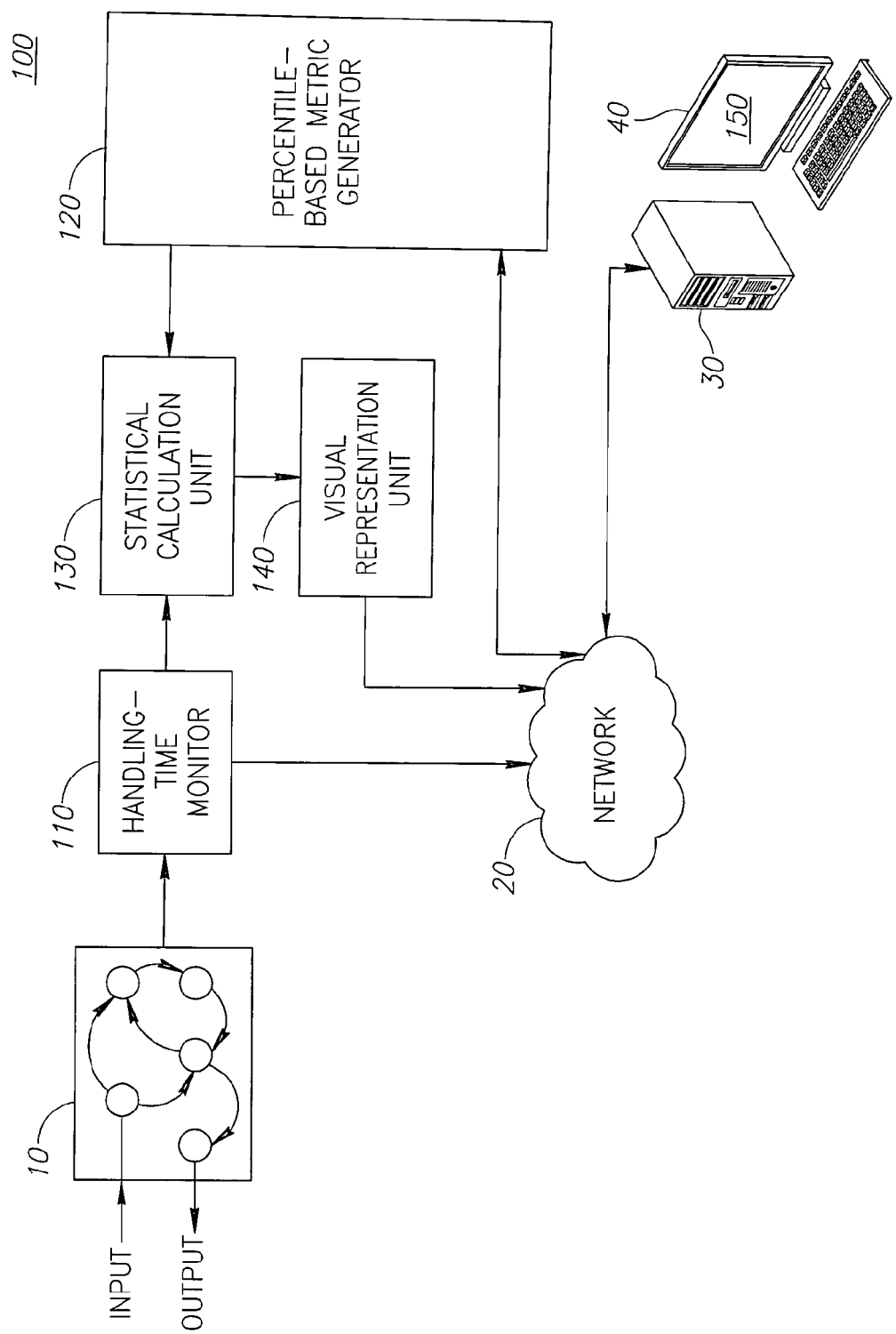
FIG. 1 is a high level schematic block diagram illustrating an exemplary system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "software defect" as used herein in this application in the context of software engineering refers to flaw, mistake, failure, or fault in a computer program or system that produces an incorrect or unexpected result, or causes it to behave in unintended ways. Most software defects arise from mistakes and errors made by people in either a program's source code or its design, and a few are caused by compilers producing incorrect code both a defect and nonconformity of software. It is noted that some standards such as ISO/IEC 9126 distinguishes between a defect and nonconformity, a defect being the non-fulfillment of intended usage requirements, whereas nonconformity is the non-fulfillment of specified requirements. The term software defect as used herein encompasses both meanings.

The term "long tail" or "heavy tail" as used herein in this application refers to heavy-tailed distributions being probability distributions whose tails are not exponentially bounded. In other words, these distributions have heavier tails than the exponential distribution. In the context of this application it is the right tail (higher x-axis values) of the distribution that is of interest.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an exemplary system according to some embodiments of the invention. System 100 may be implemented as a software analysis tool for analyzing one or more processes 10 of software defect handling using one or more statistical metrics that are at least partially percentile-based. System 100 may possibly be implemented in a client-server configuration in which a personal computer 30 of a user is connected over a network 20 to various components of the system, at the server side. Specifically, the analysis is carried out at the server side and a user may provide the requirements for that analysis and further receive a visual representation of it over a display 40 at the client side.

System 100 may include a monitoring unit 110 at the server side which is connected to an IT system of an organization or a company that provides software defect handling services implemented by on ore mode defect handling processes 10. Monitoring unit 110 may be configured to monitor one or more processes 10. The monitoring may be either in real-time or off-line. The monitoring yields samples that represent various parameters relating to defects handling time.

Additionally, system 100 may further include a percentile-based metric generator 120 possibly located at the server side. Percentile-based metric generator 120 may be in the form of a software tool that receives the samples of the defect handling time from monitoring unit 120, interacts with the user via personal computer 30 over network 20, and is further configured to generate one or more statistical metrics that are at least partially percentile-based for analyzing defect handling processes 10. The generated percentile based metrics may be designed ad hoc by the user based on the objective of the analysis and the actual monitored samples that provide the specific statistical behavior and other aspects of defect handling processes 10 that are being monitored.

Consistent with embodiments of the present invention, the custom generated percentile-based metric may be in the form of a single value percentile or a combination of several percentile values in various contexts. The generated metrics may further be taken as a function of time or other parameters that characterize the monitored behavior of the defects handling processes 10.

One the percentile-based metrics are generated, they may be used by applying them, possibly using statistical calculation unit 130 to defects handling time related data from processes 10, to yield an analysis that take into account, above all, the heavy tailed distribution nature of defects handling processes 10.

The system may further include a visual representation unit 140 configured to visually present the percentile-based analysis responsive to preferences specified by the user. The visual representation may also be tailored by the user based on the objectives of the analysis and it may further take into account the heavy tailed nature of the distribution.

Figure 2:
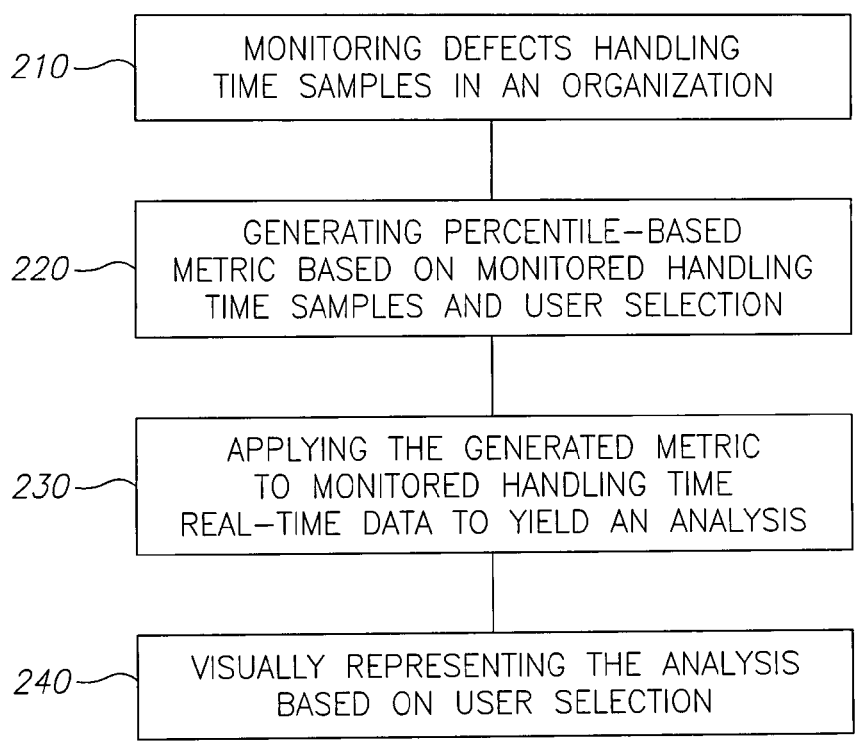
FIG. 2 is a high level flowchart illustrating an exemplary method according to some embodiments of the invention.

FIG. 2 is a high level flowchart illustrating an exemplary method according to some embodiments of the invention.

Although steps of method 200 are carried out in conjunction with particular hardware and/or software components, it is understood that method 200 is not necessarily implemented by the aforementioned architecture of system 100. Method 200 may include the following steps: monitoring or elsewhere obtaining one or more processes of software defect handling, to yield samples representative of defects handling time 210. The method then goes on to allow or directly generate one or more statistical metrics that are at least partially percentile-based, based on the monitored samples and further responsive to user selection 220. The generated metric may be used by third party analysis tools to yield an analysis that is aware of the heavy tailored nature of the monitored processes. Alternatively, in an optional stage, the method may go one to the stage of applying the generated one or more percentile-based statistical metric to real-time handling time samples, to yield a percentile based analysis of the one or more processes of software defect handling 230. Further additionally, the method may further include the stage of visually presenting the percentile responsive to preferences specified by the user 240.

Figure 3:
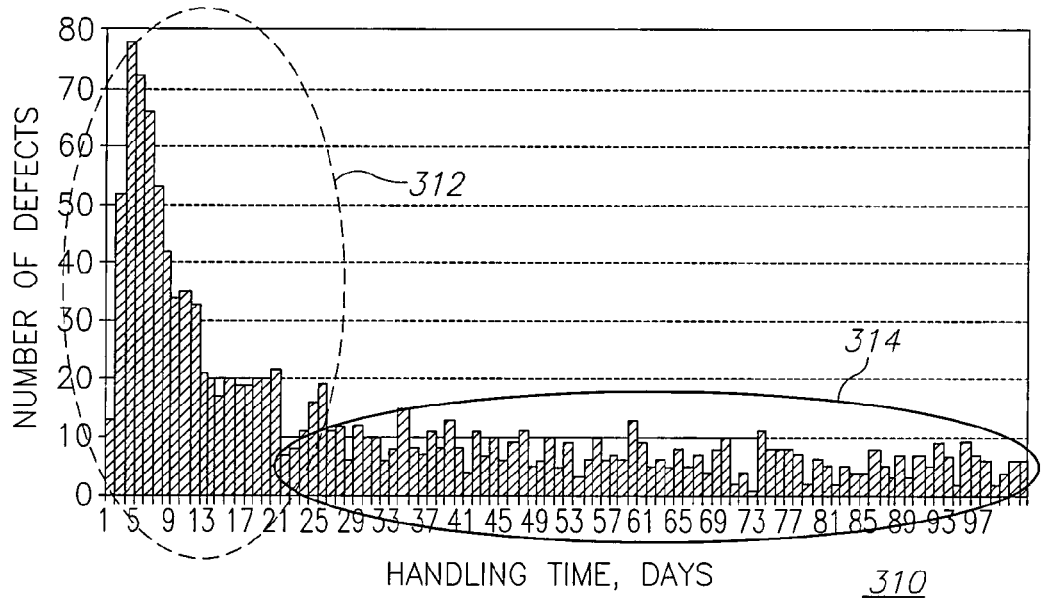
FIG. 3 is a graph illustrating an exemplary aspect according to some embodiments of the invention.

FIG. 3 is a graph illustrating an exemplary aspect according to some embodiments of the invention. Graph 310 is a histogram showing a typical distribution of the defect handling times, wherein the number of the defects is represented by the y-axis and the handling time in days is represented by the x-axis. A review of the histogram reveals that the distribution is heavy-tailed one: "the head" 312 being on the left and "the tail" 314 being on the right. The number of the defects decreases slowly and non-exponentially to the right, resulting in significant number of defects attributing to the tail being the handling time.

Based on empiric research and observations, the inventors have discovered that an approximate value of 80% percentile of the defect handling time (visually interpreted as the boundary between "the head" 312 and "the tail" 314 of the distribution) is a very important performance measure for stakeholders in the software defects handling domain. Based on the stakeholders preferences, $x_{th}$ percentile (with x=80% as a default value) is included as one metric within the set of the key process metrics. An additional advantage of the $x_{th}$ percentile over the mean value is its stability given one or two unusually long observations in the sample, which is a typical situation for a heavy-tail distribution. For example, in rare situations where it takes several years to fix some defects, the mean will be strongly affected whereas the $80^{th}$ percentile will not be significantly affected. Thus, using the $x_{th}$ percentile renders the statistical metric used for the analysis, more robust in terms of effect of outlier samples and unusual values.

Figure 4:
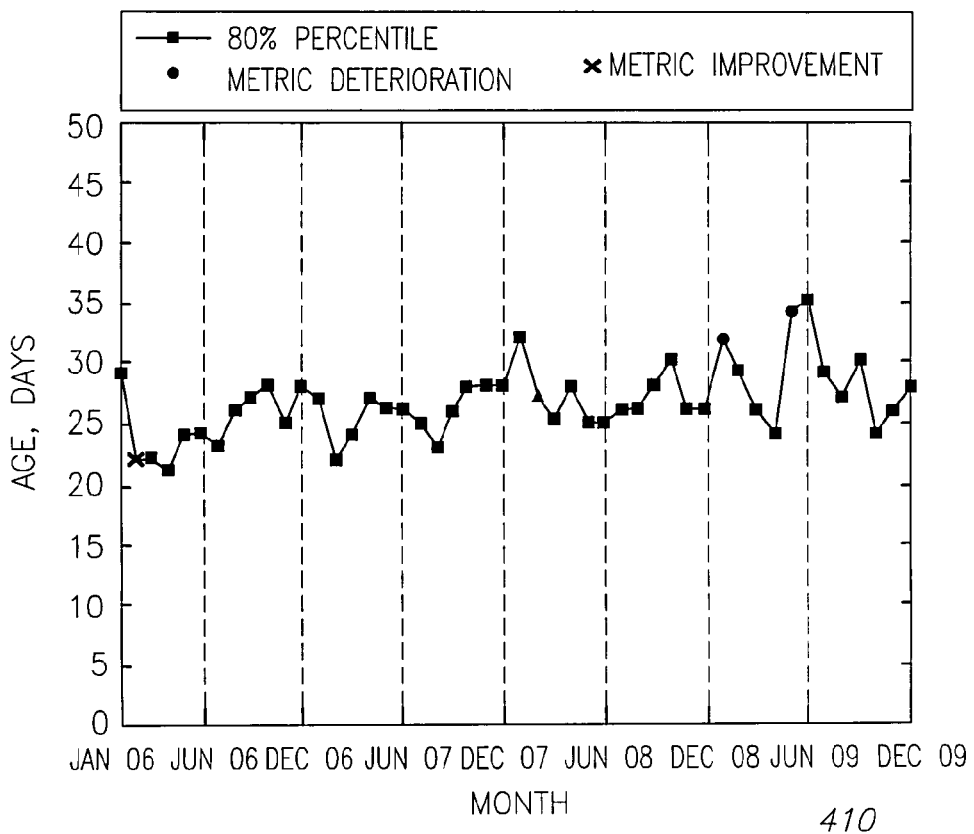
FIG. 4 is a graph illustrating an exemplary aspect according to some embodiments of the invention.

FIG. 4 is a graph 410 illustrating an exemplary aspect according to some embodiments of the invention. The graph provides comparative insight for a change in the defect handling time between two periods of time. The value of $80^{th}$ percentile is checked along two periods of time and for each point of time a visual indication is provided to whether the value has been significantly improved (denoted by 'x'=metric decreased) or deteriorated (denoted by 'o'=metric increased).

The comparison that detects statistically significant period-to-period changes, performs non-parametric tests that compare data from two time periods. It is understood that any two period of time can be compared. In an exemplary, non limiting embodiment, graph 410 illustrates a comparison between two adjacent periods. In one embodiment of visually representing the change over time in the metric, the null hypothesis is that the corresponding percentiles of the two underlying distributions are the same (denoted as a square in graph 410). If the null hypothesis is rejected, either positive or negative statistically significant change is detected. As mentioned above, the 'o' marks show statistically significant metric deterioration (increase), while the 'x' marks show statistically significant improvement (decrease) of the 80$^{th}$ percentile handling time.

Figure 5:
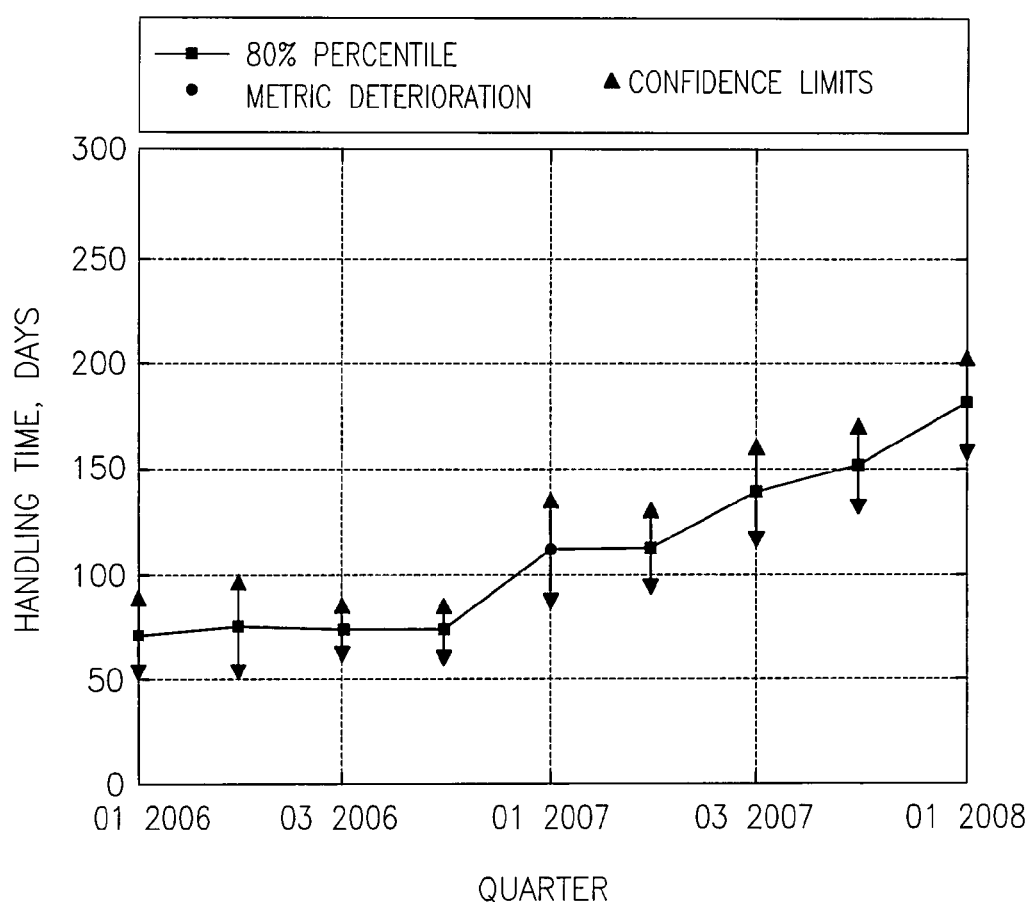
FIG. 5 is a graph illustrating an exemplary aspect according to some embodiments of the invention.

FIG. 5 is a graph illustrating an exemplary aspect according to some embodiments of the invention. Non-parametric methods may be applied in order to calculate the confidence intervals for the key metric, being the xth percentile of the defect handling time. Graph 510 illustrates an example of an output of the algorithm for determining the confidence level. Confidence intervals are useful to stakeholders for two main reasons. First, they provide intuitive graphical representation of measurement reliability: small intervals indicate high reliability and vice versa. Second, the confidence intervals are helpful for the detection of long-term trends: if the two confidence intervals do not overlap, there exists a statistically significant difference between two time periods. In graph 510 it may be shown for example, that the confidence levels of Q1 2007 and Q1 2008 are non-overlapping.

Figure 6:
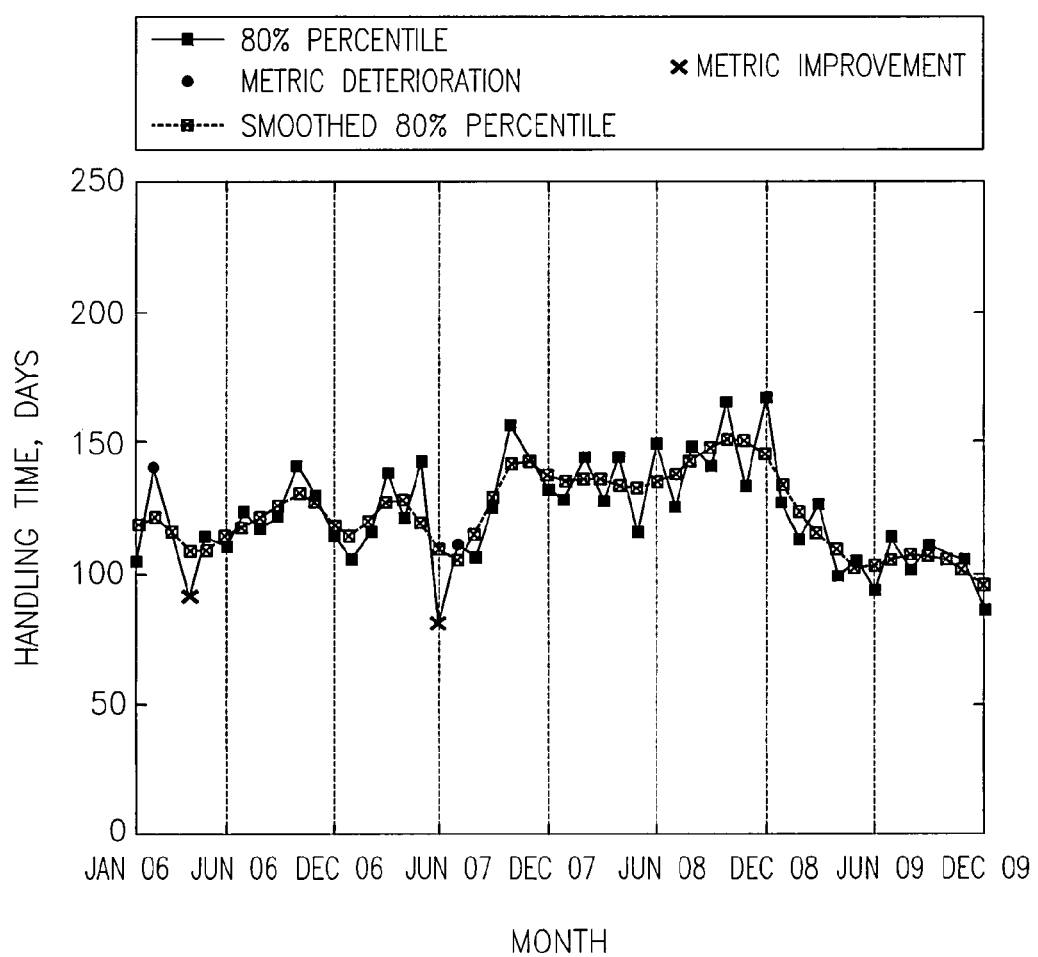
FIG. 6 is a graph illustrating an exemplary aspect according to some embodiments of the invention.

FIG. 6 is a graph illustrating another exemplary aspect according to some embodiments of the invention, in which long-term trends may be detected by smoothening the graph. In this embodiment, as opposed to period-to-period change detection, a smoothing window enables stakeholders to detect the long-term trends. Graph 610 illustrates an example of a smoothing algorithm. The inventors have discovered that binomial filter provides the best results as a smoothing algorithm. During analysis, a user may choose parameters of a smoothing window and a number of data points that is used for the calculation. The smoothing window results in smoothed curve that eliminates local derivation and enables detecting a trend of the xth percentile of the handling time over a period of time.

Figure 7:
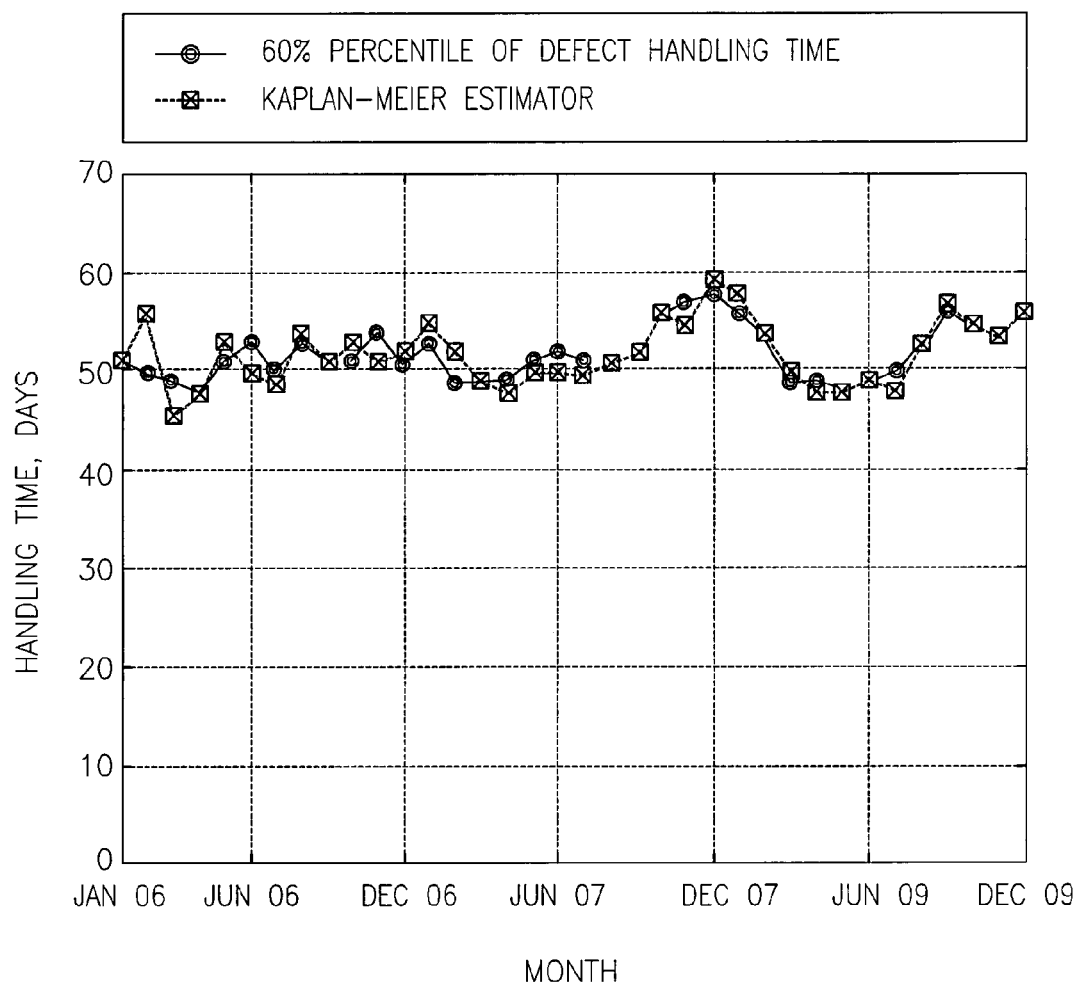
FIG. 7 is a graph illustrating an exemplary aspect according to some embodiments of the invention.

FIG. 7 is a graph illustrating yet another exemplary aspect according to some embodiments of the invention. Typical data on defects includes handling times of finished defects and ages of the unfinished ones. This type of data is an example of a censored data, since only for some observations handling times are known, while for other observation only the lower bound (current ages) is available. Using statistical methods, such as Kaplan-Meier estimator to it may be possible to "uncensor" this data and provide a fuller view of the parameters. In on example such "uncensoring" enables prediction of handling time distribution for the unfinished defects. It is understood that various modifications of standard techniques may be implemented successfully with other percentile-based metrics to reveal further statistical data. Graph 710 illustrates actual values of 80% percentiles of handling times for a certain period via à vis forecasts based of "uncensoring". The graph exhibits a good fit.

Figure 8A:
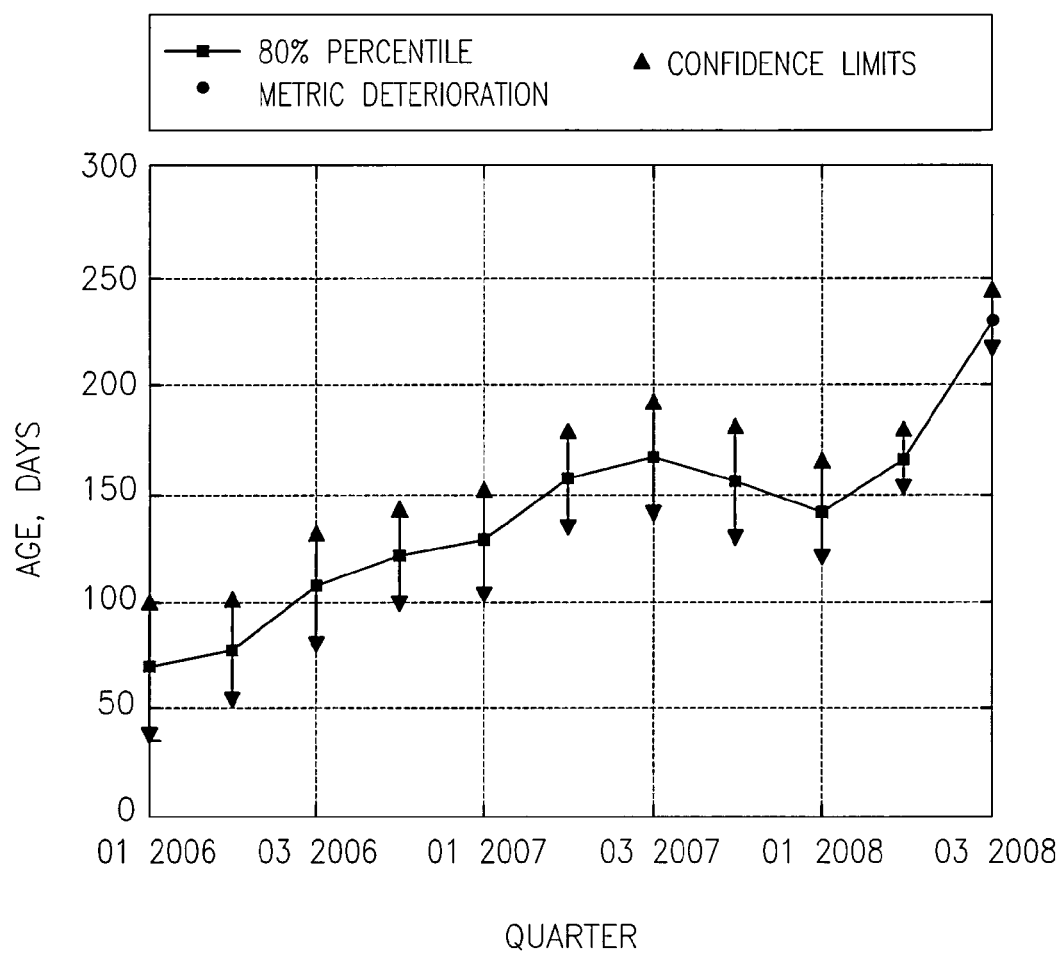
FIGS. 8A and 8B are graphs illustrating an exemplary aspect according to some embodiments of the invention.
Figure 8B:
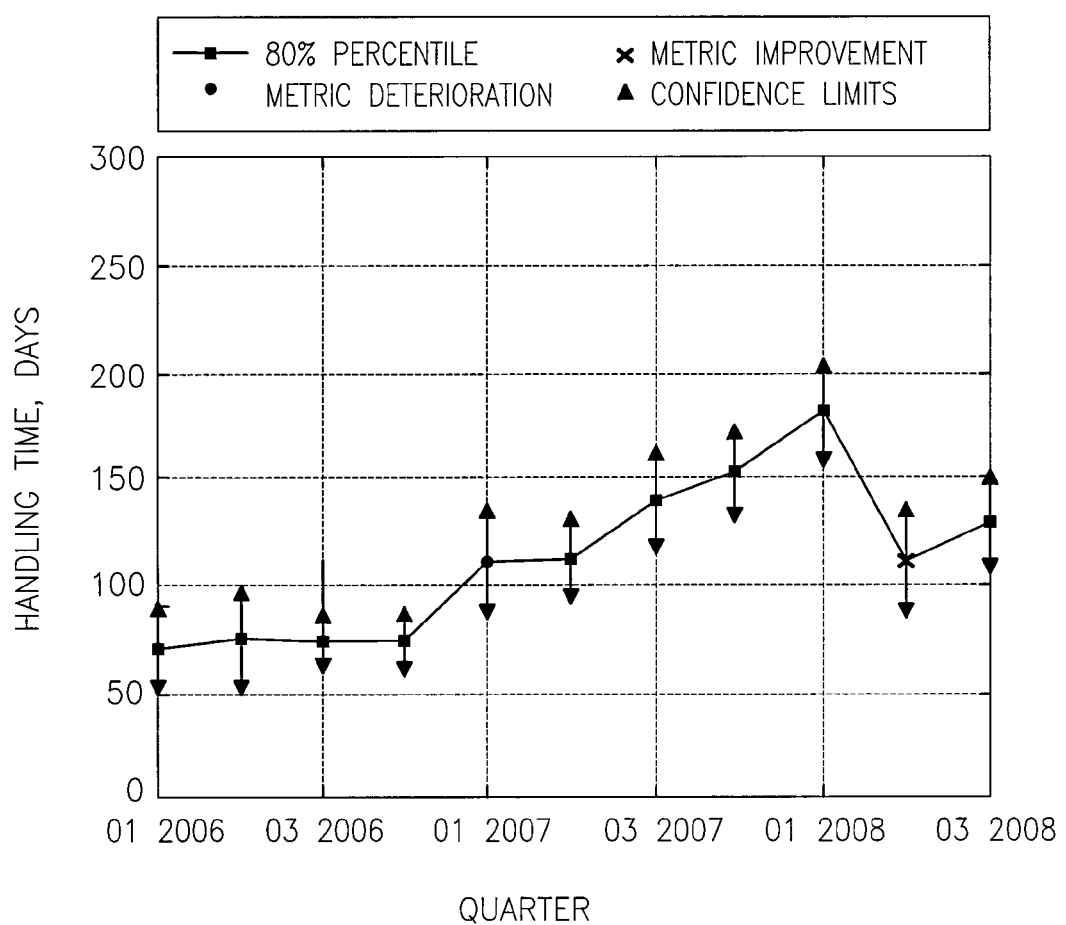

FIGS. 8A and 8B are graphs illustrating yet another exemplary aspect according to some embodiments of the invention. A multi-metric approach in which a user is presented at the same time with visual representation of more than one metric is illustrated. Graph 810 shows a "Closure Metric" indicative of the 80% percentile of closed defects. Graph 810 shows a "Open Metric" indicative of the 80% percentile of age of open defects at the end of a quarter. A close review of graphs 810 and 820 reveals that although a closure metric improves during the last two quarters, the open metric deteriorates detecting increase of age for backlog defects. A detailed study may show that the long-term defects were neglected during the last two quarters and efficiency of the overall defects handling process deteriorated. In a generalized embodiment, multi metric may be presented simultaneously allowing a user to gather more statistical insight on the defects handling process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", an "embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
    monitoring one or more processes of software defect handling, to yield samples representative of defects handling duration;
    generating one or more statistical metrics that are at least partially percentile-based, further based on the monitored samples and further responsive to user selection;
    applying the generated one or more percentile-based statistical metric to real-time handling duration samples, to yield a percentile based analysis of the one or more processes of software defect handling; and visually representing the percentile responsive to preferences specified by the user, wherein the visual representation exhibits a comparison of the percentile-based metric between two periods of time, such that improvement of the metric is visually distinguishable from deterioration thereof and from random noise, wherein at last one of: the monitoring, the generating, and the applying, is carried out by at least one computer processor.

2. The method according to claim 1, wherein the statistical metric is associated with a value of approximately 80% percentile.

3. The method according to claim 1, wherein a smoothening window is applied to the visual representation of the percentile based metric over time, to yield a visual representation indicative of long-term trends.

4. The method according to claim 1, further comprising calculating level of confidence for each percentile-based metric over time, wherein the visual presenting is indicative of a corresponding level of confidence for each percentile-based metric.

5. The method according to claim 1, wherein the visual representation exhibits two or more different metrics that are at least partially percentile-based, over time for similar periods of time, thus enabling a user to extract a fuller statistical view of the defects handling process.

6. A system comprising:
a monitoring unit configured to monitor one or more processes of software defect handling, to yield samples representative of defects handling duration;
a percentile-based generator configured to generate one or more percentile-based statistical metric, further based on the monitored samples and further responsive to user selection;
a statistical calculation unit configured to apply the generated one or more statistical metrics that are at least partially percentile-based to real-time handling duration samples obtained from the one or more processes of software defect handling, to yield a percentile based analysis of the one or more processes of software defect handling; and
a visual representation unit configured to visually represent the percentile-based analysis responsive to preferences specified by the user, wherein the visual representation exhibits a comparison of the metric based at least partially on percentile, between two periods of time, such that improvement of the metric is visually distinguishable from deterioration thereof.

7. The system according to claim 6, wherein the percentile-based statistical metric is associated with a value of approximately 80% percentile.

8. The system according to claim 6, wherein a smoothening window is applied to the visual representation of the percentile based metric over time, to yield a visual representation indicative of long-term trends.

9. The system according to claim 6, further comprising calculating level of confidence for each percentile-based metric over time, wherein the visual presenting is indicative of a corresponding level of confidence for each percentile-based metric.

10. The system according to claim 6, wherein the visual representation exhibits two or more different percentile based metrics over time for similar periods of time, thus enabling a user to extract a fuller statistical view of the defects handling process.

11. A computer program product comprising:
a non-transitory computer readable storage medium having computer readable program embodied therewith, the computer readable program comprising:
computer readable program configured to monitor one or more processes of software defect handling, to yield samples representative of defects handling duration;
computer readable program configured to generate one or more percentile-based statistical metric, further based on the monitored samples and further responsive to user selection;
computer readable program configured to apply the generated one or more statistical metric that is at least partially percentile-based, to real-time handling duration samples obtained from the one or more processes of software defect handling, to yield a percentile based analysis of the one or more processes of software defect handling; and
computer readable program configured to visually represent the percentile-based analysis responsive to preferences specified by the user, wherein the visual representation exhibits a comparison of the percentile-based metric between two periods of time, such that an improvement of the metric is visually distinguishable from a deterioration thereof and from a random noise.

12. The computer program product according to claim 11, wherein the percentile-based statistical metric is associated with a value of approximately 80% percentile.

13. The computer program product according to claim 11, wherein a smoothening window is applied to the visual representation of the percentile based metric over time, to yield a visual representation indicative of long-term trends.

14. The computer program product according to claim 11, further comprising computer readable program configured to calculate a level of confidence for each percentile-based metric over time, wherein the visual presenting is indicative of a corresponding level of confidence for each percentile-based metric.

15. The computer program product according to claim 11, wherein the visual representation exhibits two or more different percentile based metrics over time for similar periods of time, thus enabling a user to extract a fuller statistical view of the defects handling process.

* * * * *